US005621721A

United States Patent [19]
Vatuone

[11] Patent Number: 5,621,721
[45] Date of Patent: Apr. 15, 1997

[54] MAINTAINING DATABASE INTEGRITY THROUGHOUT A COMMUNICATION NETWORK

[75] Inventor: Mark Vatuone, Nine Mile Falls, Wash.

[73] Assignee: Stratacom, Inc., San Jose, Calif.

[21] Appl. No.: 372,032

[22] Filed: Jan. 12, 1995

[51] Int. Cl.$^6$ ................................................ H04L 12/56
[52] U.S. Cl. ...................... 370/16; 370/60.1; 395/182.04
[58] Field of Search ............................... 370/16, 54, 60.1, 370/60, 94.3, 94.2; 371/67.1; 395/182.02, 182.03, 182.04, 182.05

[56] References Cited

U.S. PATENT DOCUMENTS

| | | | |
|---|---|---|---|
| 5,239,537 | 8/1993 | Sakauchi | 370/16 |
| 5,301,184 | 4/1994 | Uriu et al. | 370/16 |
| 5,379,418 | 1/1995 | Shimazaki et al. | 395/182.09 |
| 5,388,212 | 2/1995 | Grube et al. | 371/67.1 |
| 5,408,463 | 4/1995 | Merchant | 370/16 |
| 5,473,598 | 12/1995 | Takatori et al. | 370/16 |

FOREIGN PATENT DOCUMENTS

| | | |
|---|---|---|
| 0484943A2 | 12/1989 | European Pat. Off. ........ 12/56 |
| 0348331A2 | 5/1992 | European Pat. Off. . |

OTHER PUBLICATIONS

Balaji Kumar, *Broadband Communications / A Professional's Guide to ATM, Frame Relay, SMDS, Sonet, and BI:SSDN* pp. 81–97, 99–110 & 141–158.

International Search Report for International Application No. PCT/US93/00465 (May 24, 1996).

*Primary Examiner*—Douglas W. Olms
*Assistant Examiner*—Min Jung
*Attorney, Agent, or Firm*—Blakely, Sokoloff, Taylor & Zafman

[57] ABSTRACT

A communication network with a database consistency mechanism is disclosed, wherein a sequence number and a set of routing information for each of a set of virtual circuits of the communication network are maintained in a main database and an auxiliary database in each of a set of communication nodes in the communication network. The sequence numbers in the main database or the auxiliary database in each of the communication nodes are verified if one of the communication nodes switches between the main database and the auxiliary database, and then virtual circuits are rerouted when necessary.

12 Claims, 5 Drawing Sheets

MAINTAINING DATABASE INTEGRITY THROUGHOUT A COMMUNICATION NETWORK

BACKGROUND OF THE INVENTION

1. Field of the Invention

The present invention pertains to the field of communication networks. More particularly, this invention relates to the maintenance of database consistency among the nodes of a communication network.

2. Background

Prior packet switching communication networks, such as asynchronous transfer mode communication networks, are typically comprised of a set of communication nodes coupled for communication over a set of high speed communication links. Such a communication network usually enables communication among a wide variety of communication devices including voice, data, video, and fax devices.

The topology of such a communication network typically enables the establishment of a variety of communication paths between any two communication nodes in the communication network. Such a communication path is typically referred to as a virtual circuit in the communication network. Typically, a physical path through the communication nodes for such a virtual circuit is established according to the bandwidth utilization requirements for the virtual circuit and the available resources in the communication nodes and the available bandwidth on the high speed communication links.

In addition, the communication nodes in such a network may implement standby or redundant elements such as auxiliary processors. Such a redundant implementation enables the communication node to switch from a main processor to an auxiliary processor upon a main processor failure. Such a main processor to auxiliary processor switchover typically prevents failure of the communication node and consequential losses in communication throughout the communication network when such a failure occurs. Typically, the roles of main and auxiliary processors are not fixed to a particular module or circuit board. The active processor may be referred to as "main" and the non-active processor as "auxiliary".

Typically, each communication node in such a network maintains a set of routing databases that specify the routing of all virtual circuit paths through the communication links and communication nodes of the network. In addition, such routing databases may specify the network resources allocated to the virtual circuits. Typically, the main processor in such a communication node maintains and updates a main routing database while the auxiliary processor maintains and updates an auxiliary routing database that reflects the exact contents of the main routing database. Such an updated auxiliary database enables rapid switchover from the main processor to the auxiliary processor upon a failure in the main processor or main processor software.

A virtual circuit is typically established in such a communication network by transferring routing messages to each communication node. The routing messages usually specify a physical path through the communication network and a corresponding set of communication resources for the virtual circuit. The routing messages enable the main processor in each communication node to update the internal main routing database. In addition, each main processor typically causes the corresponding auxiliary processor to update the internal auxiliary routing database to reflect the new routing information.

Virtual circuit routing usually occurs at connection set-up time. Virtual circuit routing also typically occurs in response to link failures in the network which is referred to as rerouting. The processor of rerouting involves selection of a path which does not include the failed link. Updates typically occur in discrete messages of logical connection information and virtual circuit information.

Unfortunately, inconsistencies among the routing databases in such a communication network may arise if a main processor to auxiliary processor switchover occurs while a virtual circuit is being established and routed through the communication network. For example, a failure in a main processor of one of the communication nodes may cause a switchover to the auxiliary processor before the corresponding auxiliary routing database is updated with information for a newly established or rerouted virtual circuit.

As a consequence, the activated auxiliary processor does not have an updated view of the virtual circuits and configuration of the communication network. Such losses in database integrity can cause a variety of errors in the communication network. For example, such losses in database integrity may cause the over utilization of one or more of the communication links in the communication network or a loss of service. In addition, such losses in database integrity may cause the improper allocation of communication resources in the communication network for subsequently established virtual circuits.

SUMMARY AND OBJECTS OF THE INVENTION

One object of the present invention is to maintain database integrity among the communication nodes of a communication network.

Another object of the present invention is to maintain database integrity during switchovers between main and standby databases in the communication nodes of the communication network.

A further object of the present invention is to provide internal and external database integrity mechanisms for a communication network.

These and other objects of the invention are provided by a communication network, wherein a sequence number and a set of routing information for each of a set of virtual circuits of the communication network are maintained in a main database and an auxiliary database in each of a set of communication nodes in the communication network. A new sequence number is assigned to a virtual circuit each time the virtual circuit is routed. The sequence numbers in the main database or the auxiliary database in each of the communication nodes are internally and externally verified if one of the communication nodes switches between the main database and the auxiliary database. If an internal or external sequence number mismatch is detected during verification, then the corresponding virtual circuit is rerouted through the communication network.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
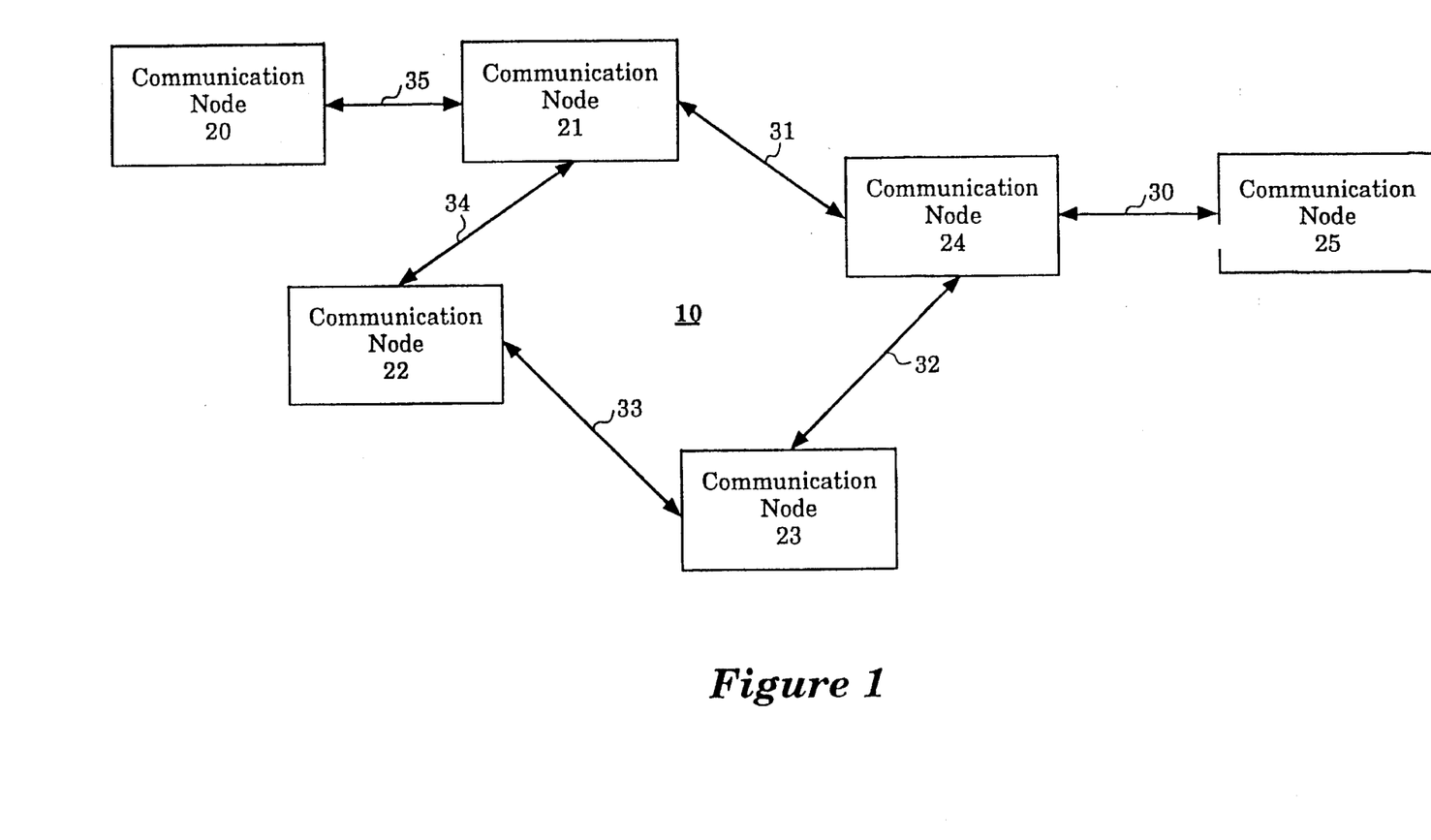
FIG. 1 illustrates a communication network for one embodiment which comprises a set of communication nodes coupled for communication over a set of communication links each comprising one or more common carrier communication links.

FIG. 1 illustrates a communication network 10 for one embodiment. The communication network 10 comprises a set of communication nodes 20–25 coupled for communication over a set of communication links 30–35. For one embodiment, each communication link 30–35 comprises one or more common carrier communication links.

Each communication node 20–25 includes a main processor unit and an auxiliary processor unit. The main processor unit in each communication node 20–25 maintains a main routing database that specifies the routing of virtual circuit paths through the communication network 10. The main routing database maintained by the main processor in each communication node 20–25 also contains resource allocation information for the virtual circuits in the communication network 10. The resource allocation information includes, for example, the bandwidth utilization of the virtual circuits on the common carrier communication line trunks of the communication links 30–35.

The auxiliary processor in each communication node 20–25 maintains an auxiliary routing database. The auxiliary routing database in each communication node 20–25 reflects the information maintained by the main processor in the corresponding main routing database. The main processor unit each communication node 20–25 transfers update database messages to the auxiliary processor unit as the main processor unit updates the main routing database. The update database messages enable the auxiliary processor unit to update the auxiliary routing database to reflect the updated state of the main routing database.

The communication nodes 20–25 are each capable of originating and establishing virtual circuit paths through the communication network 10. The communication node that originates and establishes a virtual circuit is referred to as the master communication node for that virtual circuit. For example, the communication node 20 is the master communication node for virtual circuits originating at the communication node 20.

The communication node that terminates a virtual circuit through the communication network is referred to as the slave communication node for that virtual circuit. Communication nodes located along the virtual circuit path between the master communication node and the slave communication node of a virtual circuit are referred to as intermediate communication nodes for that virtual circuit. Communication nodes of the communication network that are not located along the virtual circuit path of a virtual circuit are referred to as uninvolved communication nodes for that virtual circuit.

For example, a virtual circuit path may be established between the communication node 20 as a master communication node and the communication node 25 as a slave communication node for the virtual circuit. The master communication node 20 establishes the virtual circuit through the communication network 10 by examining the available resources as indicated by the routing databases in the communication node 20. The master communication node 20 uses routing information from the corresponding routing databases to select a physical path through the communication network 10 to the slave communication node 25. As an example, the master communication node 20 may select a virtual circuit path through the communication nodes 21 and 24 to the slave communication node 25. The master communication node 20 establishes such a virtual circuit by transferring routing messages to the intermediate communication nodes 21 and 24 and to the slave communication node 25 via the communication links 35, 31, and 30.

The intermediate communication nodes 21 and 24 each use the routing messages from the master communication node 20 to update the corresponding internal routing databases to reflect the newly established virtual circuit path through the communication network 10. The slave communication node 25 also uses the routing message from the master communication node 20 to update the corresponding internal routing databases to reflect the newly created virtual circuit.

The communication node 20 also transfers routing messages to the uninvolved communication nodes 22 and 23 for the newly created virtual circuit through the communication network 10. The uninvolved communication nodes 22 and 23 each use the routing messages to update the corresponding internal routing databases to reflect the newly established virtual circuit.

The main processor unit in the master communication node 20 transfers messages to the corresponding auxiliary processor unit and the auxiliary processor unit accordingly updates the auxiliary routing database to reflect the newly created virtual circuit in the main routing database. In addition, the main processor unit in each intermediate communication node 21 and 24 and in the slave communication node 25 and in each uninvolved communication node 22 and 23 transfer similar messages to the corresponding auxiliary processor units to update the auxiliary routing databases for the newly created virtual circuit.

Figure 2:
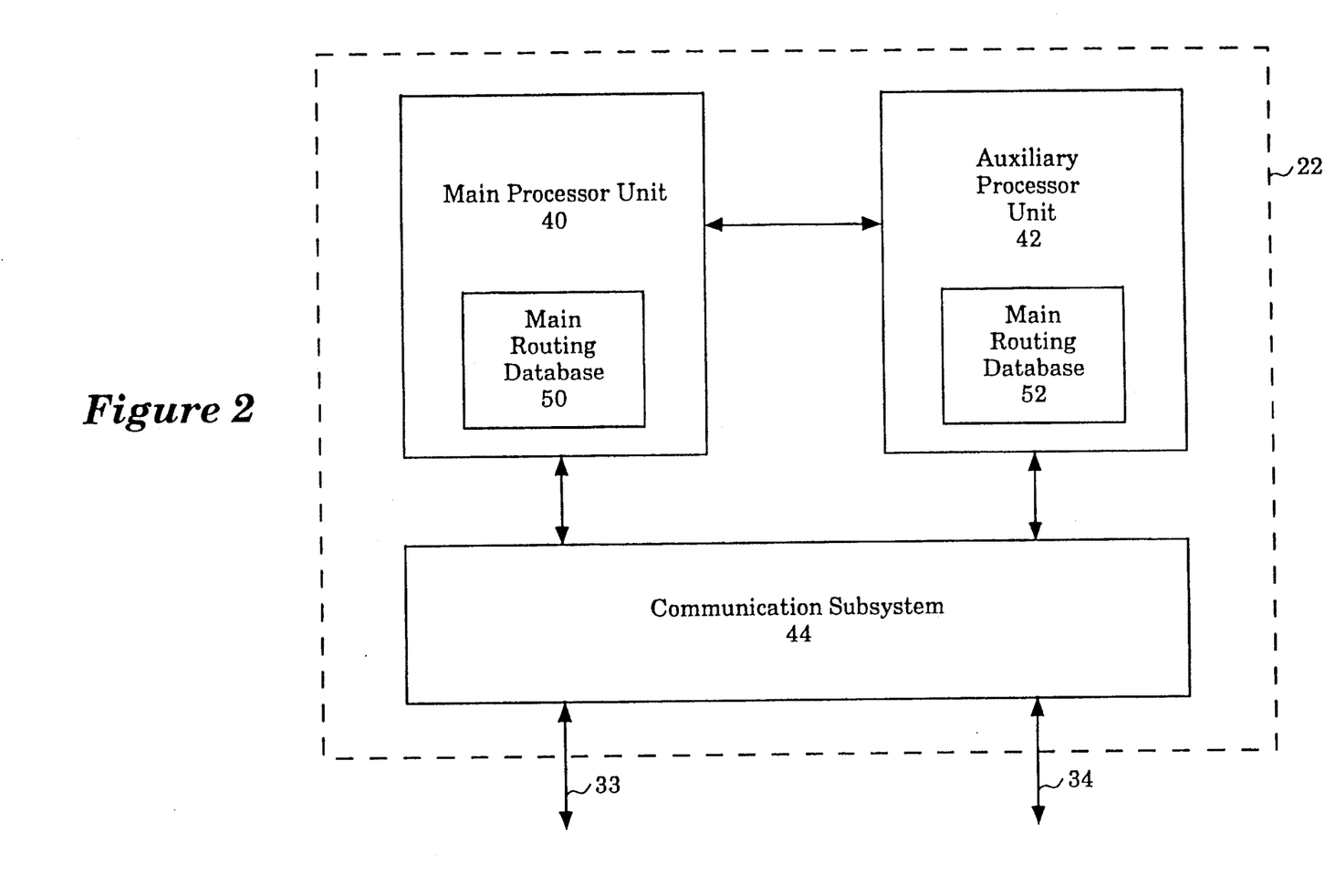
FIG. 2 illustrates a communication node for one embodiment which comprises a main processor unit, an auxiliary processor unit, and a communication subsystem that enables high speed digital asynchronous transfer mode communication via the communication links.

FIG. 2 illustrates the communication node 22 for one embodiment. The communication node 22 is substantially similar to the communication nodes 20, 21, and 23–25. The communication node 22 comprises a main processor unit 40, an auxiliary processor unit 42, and a communication subsystem 44. The communication subsystem 44 enables high speed digital asynchronous transfer mode communication via the communication links 33 and 34.

The main processor unit 40 maintains a main routing database 50. The auxiliary processor unit 42 maintains an auxiliary routing database 52. The main routing database 50 and the auxiliary routing database 52 each indicate the configuration and resource allocation of virtual circuits established in the communication network 10.

The main processor unit 40 updates the main routing database 50 as virtual circuits in the communication network 10 are established with the communication node 22 as master. The main processor unit 40 transfers database update messages to the auxiliary processor unit 42 that cause the auxiliary processor unit 42 to update the auxiliary routing database 52 to reflect the newly established virtual circuits.

In addition, the main processor unit 40 receives routing messages from other communication nodes in the communication network 10 through the communication subsystem 44. The main processor unit 40 uses the routing messages externally received from other communication nodes in the communication network 10 to update the main routing database 50. The external routing messages indicate the establishment of virtual circuits in the communication network 10 by other communication nodes. The main processor unit 40 uses the database update messages to update the main routing database 50 and then transfers a corresponding routing message to the auxiliary processor unit 42 to update the auxiliary routing database 52.

Figure 3:
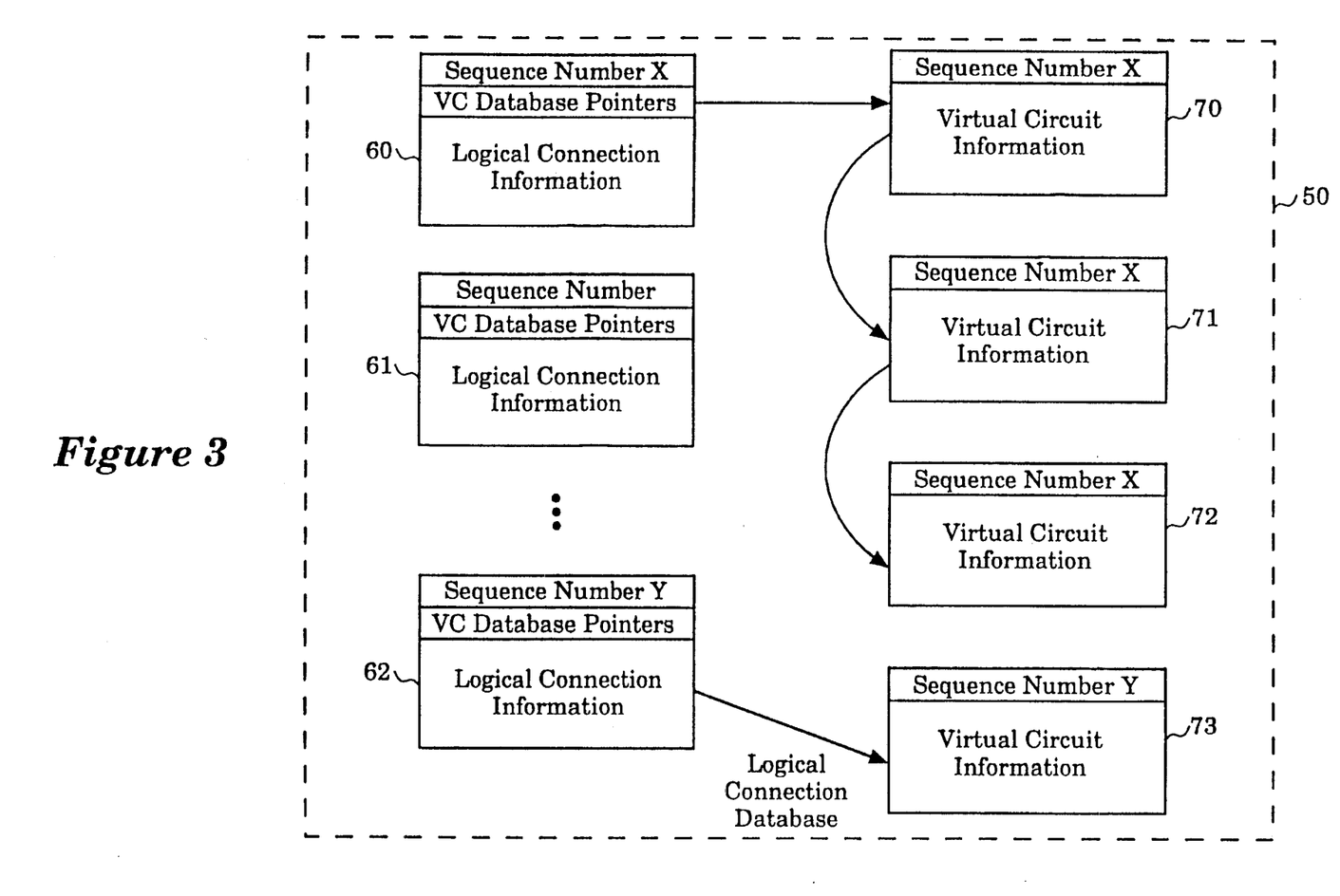
FIG. 3 illustrates the logical connection portion of the main routing database which is maintained by the main processor unit and which is reflected in the auxiliary routing database, and which stores information on virtual circuits established in the communication network.

FIG. 3 illustrates a logical connection portion of the main routing database 50. The logical connection portion of the main routing database 50 is maintained by the main processor unit 40 and is reflected in the auxiliary routing database 52. The logical connection portion of the main routing database 50 stores information on virtual circuits established in the communication network 10 wherein the communication node 22 is either a master communication node for the virtual circuit or a slave communication node for the virtual circuit.

The logical connection database includes a set of logical connection entries 60–62. Each logical connection entry 60–62 includes a sequence number, a virtual circuit (VC) database pointer, and a set of logical connection information. The logical connection information in each logical connection entry 60–62 specifies a physical path through the communication network 10 for the corresponding virtual circuit. The virtual circuit database pointer of each logical connection entry 60–62 points to a linked list of virtual circuit entries that correspond to the logical connection. For example, the virtual circuit database pointer of the logical connection entry 60 points to a linked list of virtual circuit entries 70–72 that correspond to the logical connection entry 60.

Each virtual circuit entry 70–73 includes a sequence number and a set of virtual circuit information. The virtual circuit information in each virtual circuit entry 70–73 specifies resources allocated in the communication network 10 to the corresponding virtual circuit.

The logical connection information in each logical connection entry 60–62 describes the paths and the resources of communication network 10 allocated to the corresponding virtual circuits. For example, the logical connection information in the logical connection entry 60 contains path and resource allocation information for the virtual circuits that correspond to the virtual circuit entries 70–72.

The main processor unit 40 and the auxiliary processor unit 42 maintain the logical connection databases in the main routing database 50 and the auxiliary routing database 52 to reflect virtual circuits in the communication network 10 having the communication node 22 as the master communication node. In addition, the main routing database 50 and the auxiliary routing database 52 contain a similar logical connection database that reflects the virtual circuits on the communication network 10 having the communication node 22 as the slave communication node.

Figure 4:
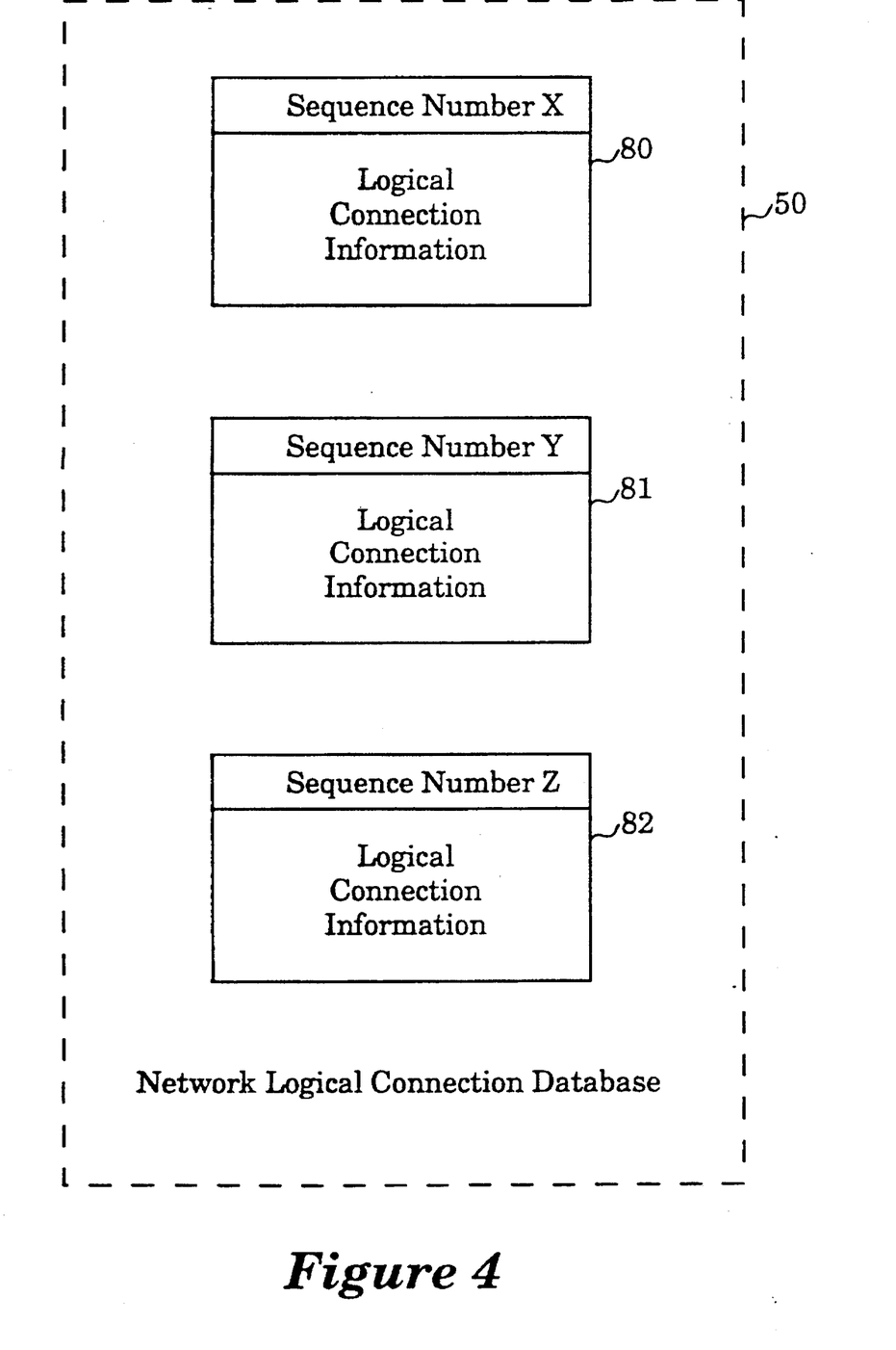
FIG. 4 illustrates a network logical connection database contained in the main routing database and reflected in the auxiliary routing database and which stores information on virtual circuits established in the communication network.

FIG. 4 illustrates a network logical connection database contained in the main routing database 50 and the auxiliary routing database 52. The network logical connection database reflects information on virtual circuits established in the communication network 10 wherein the communication node 22 is either an intermediate node for the virtual circuit or an uninvolved node for the virtual circuit.

The network logical connection database comprises a set of network logical connection entries 80–82. Each network logical connection entry 80–82 includes a sequence number and a set of logical connection information.

The sequence numbers in the logical connection database and the network logical connection database of the main routing database and the auxiliary routing database in each communication node 20–25 is used to maintain database consistency throughout the communication network 10. A sequence number is assigned to a virtual circuit at routing time. Connections are routed when a virtual circuit is established or a line failure is detected in the communication network 10. The sequence number for a given virtual circuit is generated by the master communication node that routes or establishes that virtual circuit.

For example, the communication node 22 generates a sequence number for each virtual circuit established by the communication node 22 as a master communication node. The communication node 22 may include for example, a counter that generates the sequence number. The main processor unit 40 writes the newly generated sequence number for each newly established virtual circuit into the appropriate logical connection entries and virtual circuit entries in the main routing database 50.

In addition, the main processor unit 40 transfers update messages to the auxiliary processor unit 42 that cause the auxiliary processor unit 42 to update the auxiliary routing database 52 with a newly established virtual circuit including the newly generated sequence number for the virtual circuit. The communication node 22 also transfers routing messages to the communication nodes 20, 21, and 23–25 in a daisy-chain fashion to update the remaining routing databases in the communication network 10. The routing messages transferred by the master communication node 22 to the remainder of the network 10 include the sequence number for the newly created virtual circuit. The communication nodes 20, 21, and 23–25 each update the internal main routing databases and auxiliary routing databases with the newly generated sequence numbers for the newly routed virtual circuit.

Figure 5:
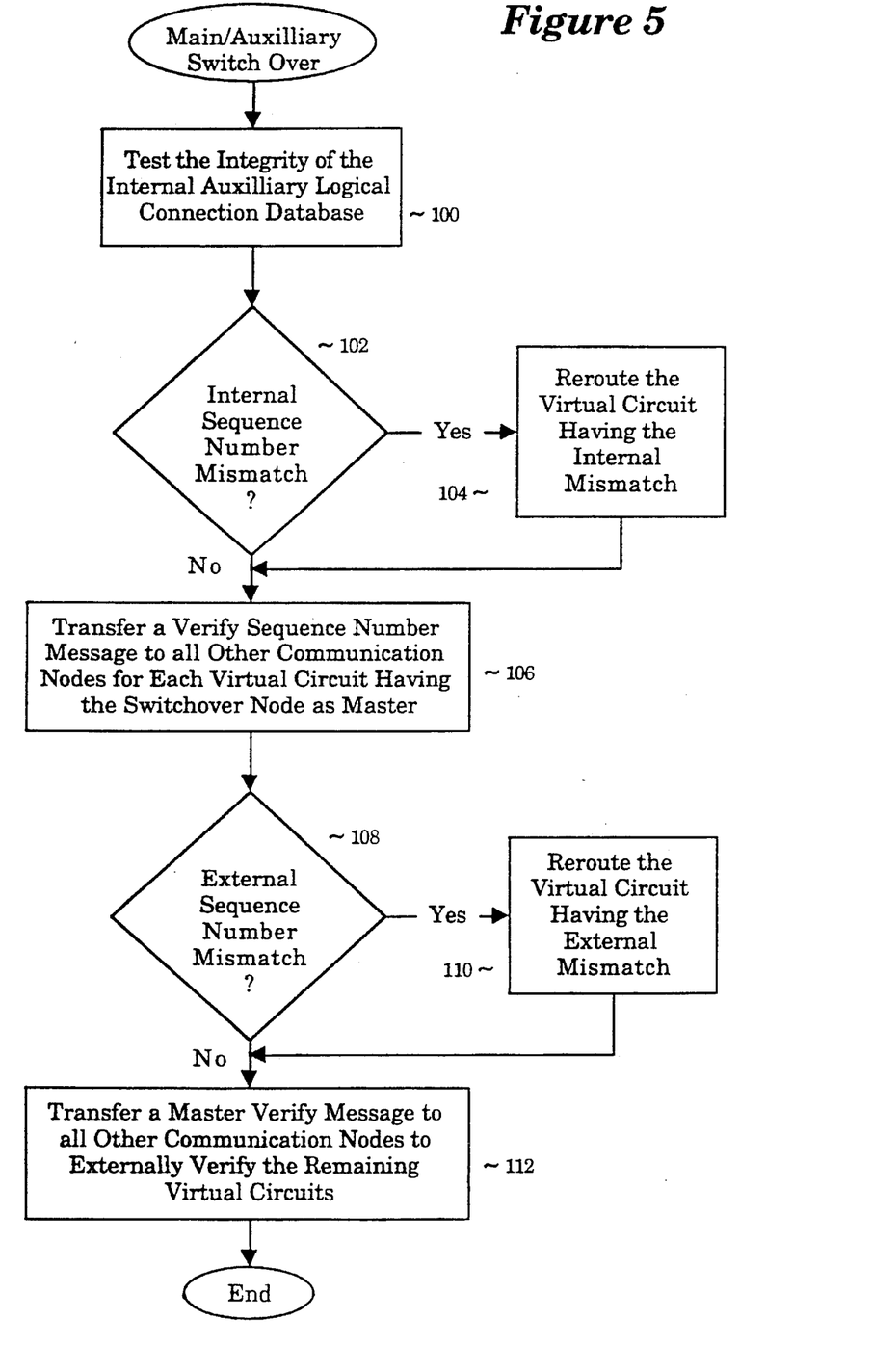
FIG. 5 illustrates the method for maintaining the integrity of the main and auxiliary routing databases in the communication nodes of the communication network after a main processor unit to auxiliary processor unit switchover occurs.

FIG. 5 illustrates a method for maintaining the integrity of the main and auxiliary routing databases in the communication nodes 20–25 of the communication network 10 when a main processor unit to auxiliary processor unit switchover occurs. In this example, the switchover occurs from the main processor unit 40 to the auxiliary processor unit 42 in the communication node 22.

At block 100, the auxiliary processor unit 42 tests the integrity of the internal logical connection database contained in the auxiliary routing database 52. The auxiliary processor unit 42 tests the logical connection database in the auxiliary routing database 52 by comparing the sequence numbers of the logical connection entries 60–62 against the corresponding sequence numbers of the virtual circuit entries 70–73. For example, the auxiliary processor unit 42 compares the sequence number of the logical connection entry 60 to the sequence number of each virtual circuit entry 70–72. Similarly, the auxiliary processor unit 42 compares the sequence number of the logical connection entry 62 to the sequence number of the virtual circuit entry 73.

At decision block 102, the auxiliary processor unit 42 determines whether an internal sequence number mismatch was detected at block 100. If an internal sequence number mismatch is detected then control proceeds to block 104. At block 104, the auxiliary processor unit 42 reroutes the virtual circuit having the internal sequence number mismatch. The auxiliary processor unit 42 reroutes the virtual circuit by generating a new sequence number for the virtual circuit and daisy chaining messages containing the new sequence number throughout the communication network 10 as described above.

If an internal sequence number mismatch is not detected at decision block 102 then control proceeds to block 106. At block 106, the auxiliary processor unit 42 searches the logical connection database of the auxiliary routing database 52 to determine the virtual circuits having the communication node 22 as the master communication node. For each virtual circuit having the communication node 22 as the master communication node, the auxiliary processor unit 42 transfers a verify sequence number message to all other communication nodes in the communication network 10 to verify the external routing databases. Each verify sequence number message includes a sequence number and a corresponding virtual circuit identifier.

The verify sequence number message from the communication node 22 causes each uninvolved communication node or intermediate communication node on the communication network 10 to verify the specified sequence number for the virtual circuit in the corresponding internal network logical connection database. For example, the communication node 22 would process a verify sequence number message from some other node in the communication network 10 by comparing the sequence number of the sequence number message to the sequence number of the network logical connection entry 80–82 that corresponds to the virtual circuit specified in the verify sequence number message.

The verify sequence number message causes a slave communication node corresponding to the virtual circuit to verify the sequence number against the sequence numbers in the logical connection database of the slave communication node. For example, the communication node 22 as a slave communication node would processes a verify sequence number message by comparing the sequence numbers of the logical connection entries 60–62 against the corresponding sequence numbers of the virtual circuit entries 70–73.

If a mismatch is detected for a particular virtual circuit either an intermediate or a slave or an uninvolved communication node, then the communication node that detects the mismatch transfers an external sequence mismatch message to the master communication node, in this example the communication node 22, that specifies the mismatched virtual circuit.

At block 108, the auxiliary processor unit 42 determines whether an external sequence number mismatch occurred in response to the verify sequence number message at block 106. An external sequence number mismatch is indicated at decision block 108 by an external sequence mismatch message transferred to the communication node 22 from one of the remaining communication nodes 20, 21 or 23–25. If an external sequence number mismatch is detected at decision block 108 then control proceeds to block 110. At block 110, the auxiliary processor unit 42 reroutes the virtual circuit corresponding to the verify sequence number message that caused the external sequence number mismatch.

At block 112, the auxiliary processor unit 42 transfers a master verify message to all other communication nodes in the communication network 10. The master verify message causes each communication node 20, 21, and 23–25 to externally verify the virtual circuits in the same manner as described in block 106 for each virtual circuit having the communication node 20, 21, and 23–25 as a master communication node.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for determining database consistency in a communication network, comprising the steps of:

storing a sequence number and a set of routing information for each of a set of virtual circuits of the communication network into a main database and an auxiliary database in each of a set of communication nodes in the communication network, the main database and the auxiliary database each comprising a set of logical connection entries and a set of virtual circuit envies, the sequence number for a virtual circuit being updated each time the virtual circuit is routed or rerouted within the communication network; and verifying the sequence numbers in the main database or the auxiliary database in each of the communication nodes if one of the communication nodes switches between the main database and the auxiliary database by comparing the sequence numbers of the logical connection entries to the sequence numbers of the corresponding virtual circuit entries to determine if a sequence number mismatch exists.

2. The method of claim 1, further comprising the step of rerouting the virtual circuits having a sequence number mismatch in the main database or the auxiliary database in one or more of the communication nodes.

3. The method of claim 1, wherein each sequence number is generated by one of the communication nodes that originates the corresponding virtual circuit.

4. The method of claim 1, wherein the step of storing a sequence number and a set of routing information for each of a set of virtual circuits comprises the step of transferring a routing message containing the sequence number and the routing information from one of the communication nodes that originates the virtual circuit to the remaining communication nodes of the communication network.

5. The method of claim 1, wherein the main database and the auxiliary database each further comprise a set of network logical connection entries and wherein the step of verifying the sequence numbers in the main database or the auxiliary database further comprises the steps of:

transferring a message containing a sequence number and a virtual circuit identifier from one of the communication nodes that originated the virtual circuit that corresponds to the virtual circuit identifier to the remaining communication nodes in the communication network;

comparing the sequence numbers of the network logical connection entries for the virtual circuit that correspond to the virtual circuit identifier to the sequence number of the message.

6. An apparatus for determining database consistency in a communication network, comprising:

means for storing a sequence number and a set of routing information for each of a set of virtual circuits of the communication network into a main database and an auxiliary database in each of a set of communication nodes in the communication network, the main database and the auxiliary database each comprising a set of logical connection entries and a set of virtual circuit entries, the sequence number for a virtual circuit being updated each time the virtual circuit is routed or rerouted within the communication network; and means for verifying the sequence numbers in the main database or the auxiliary database in each of the communication nodes if one of the communication nodes switches between the main database and the auxiliary database by comparing the sequence numbers of the logical connection entries to the sequence numbers of the corresponding virtual circuit entries to determine if a sequence number mismatch exists.

7. The apparatus of claim 6, further comprising means for rerouting the virtual circuits having a sequence number mismatch in the main database or the auxiliary database in one or more of the communication nodes.

8. The apparatus of claim 6, wherein each sequence number is generated by one of the communication nodes that originates the corresponding virtual circuit.

9. The apparatus of claim 6, wherein the means for storing a sequence number and a set of routing information for each of a set of virtual circuits comprises means for transferring a routing message containing the sequence number and the routing information from one of the communication nodes that originates the virtual circuit to the remaining communication nodes of the communication network.

10. The apparatus of claim 6, wherein the main database and the auxiliary database each further comprise a set of network logical connection entries and wherein the means for verifying the sequence numbers in the main database or the auxiliary database further comprises:

means for transferring a message containing a sequence number and a virtual circuit identifier from one of the communication nodes that originated the virtual circuit that corresponds to the virtual circuit identifier to the remaining communication nodes in the communication network; and means for comparing the sequence numbers of the network logical connection entries for the virtual circuit that correspond to the virtual circuit identifier to the sequence number of the message.

11. A method for determining database consistency in a communication node of a network, comprising the steps of:

storing a sequence number and a set of routing information for a virtual circuit of the communication network into a first database and a second database of the communication node whenever the virtual circuit is routed or rerouted within the communication network;

switching from the first database to the second database;

verifying that the first database and the second database store a same sequence number for the virtual circuit by comparing a sequence number corresponding to the virtual circuit stored in the second database to a corresponding sequence number associated with the virtual circuit stored in the first database; and rerouting the virtual circuit within the communication network if there is a mismatch of the sequence numbers stored in the first and second databases.

12. An apparatus for determining database consistency in a communication node of a communication network, comprising:

means for storing a sequence number and a set of routing information for a set of virtual circuit of the communication network into a first database and a second database of the communication node each time the virtual circuit is routed or rerouted within the communication network;

means for switching from the first database to the second database;

means for verifying that the first database and the second database store a same sequence number for the virtual circuit by comparing a sequence number corresponding to the virtual circuit stored in the second database to a corresponding sequence number associated with the virtual circuit stored in the first database; and means for rerouting the virtual circuit within the communication network if there is a mismatch of the sequence numbers stored in the first and second databases.

* * * * *